United States Patent [19]

Sneddon

[11] Patent Number: 5,048,914

[45] Date of Patent: Sep. 17, 1991

[54] ELECTRICAL CONNECTORS INCORPORATING AUTOMATIC POWER CONTROL

[75] Inventor: John L. Sneddon, Aberdeen, Great Britain

[73] Assignee: NL Petroleum Services (U.K.) Limited, United Kingdom

[21] Appl. No.: 283,590

[22] Filed: Dec. 13, 1988

[30] Foreign Application Priority Data

Dec. 18, 1987 [GB] United Kingdom ................ 8729512

[51] Int. Cl.$^5$ ................................ G02B 6/42

[52] U.S. Cl. ................................ 385/53; 385/24

[58] Field of Search ................ 350/96.1, 96.15, 96.16, 350/96.20, 96.23; 335/1-3

[56] References Cited

U.S. PATENT DOCUMENTS

| | | | |
|---|---|---|---|
| 3,475,569 | 10/1969 | Glaudot | 200/50 B |
| 3,496,500 | 2/1970 | Romary | 335/205 |
| 3,649,839 | 3/1972 | Appleton | 250/215 |
| 4,549,783 | 10/1985 | Schmachtenberg, III | 350/96.20 |
| 4,591,732 | 5/1986 | Neuenschwander | 307/140 |
| 4,644,179 | 2/1987 | Pointout et al. | 307/10 BP |
| 4,816,792 | 3/1989 | Belbel et al. | 335/14 |

FOREIGN PATENT DOCUMENTS

| | | |
|---|---|---|
| 781133 | 8/1957 | United Kingdom . |
| 2013332 | 8/1979 | United Kingdom . |
| 2152302 | 7/1985 | United Kingdom . |

*Primary Examiner*—Frank Gonzalez

*Attorney, Agent, or Firm*—Browning, Bushman, Anderson & Brookhart

[57] ABSTRACT

An electrical power connector for use in a hazardous environment, such as in a sub-sea distribution system for distributing electrical power to remote oil well heads from a marine platform. The sub-sea connector comprises first and second connector bodies, one of which houses a solid state electrical power switch and switch control means. The switch control means is responsive to a non-electrical control system, e.g. an optical signal, which is transmitted between the connector bodies by a transmission path which is interrupted when the bodies move apart by a first short distance, to cause the solid state switch to switch the power off. The actual power contacts in the first and second bodies do not separate from physical engagement until the bodies move apart by a second distance, greater than the first distance. Thus the power contacts can only separate, and engage, when they are electrically dead. This provides positive disconnection without sparking at the sub-sea connector, even if the primary power source at the marine platform has been accidentally left live, thereby ensuring diver safety.

16 Claims, 3 Drawing Sheets

ELECTRICAL CONNECTORS INCORPORATING AUTOMATIC POWER CONTROL

FIELD OF THE INVENTION

This invention relates to electrical connectors incorporating an automatic power control adapted to switch off electrical power passing through the connector prior to physical separation of the electrical contacts.

The International Electrotechnical Commission (IEC) standard 79-0 concerns electrical apparatus for explosive gas atmospheres. Paragraph 19 thereof requires for group I apparatus that plugs and sockets shall be interlocked mechanically or electrically so that they cannot be separated when the contacts are energized and so that the contacts cannot be energized when the plug and socket are separated. For group II apparatus, plug and socket assemblies which are designed to break the full-rated current with delayed release to permit the arc to be extinguished before separation, and which remain flame proof during the arc quenching period, and with a cover providing a specified degree of protection for the exposed socket outlet, need not comply with the requirements for group I apparatus. Group I refers to applications in underground coal mines where conditions are mechanically arduous, and group II refers to surface industry.

Similar technical problems arise in the construction of electrical connectors for use under water or immersed in other fluids. For example in the oil and gas industry there is a substantial requirement for subsea electrical power supplies in connection with assembly and maintenance work on subsea well heads and other equipment including subsea manifold pumping equipment operated by remote control from a marine patform or from an onshore control station. A human diver carries electrically conductive equipment and can experience serious or fatal electrical shock from faulty or damaged subsea electrical connectors, cables and equipment, without even directly touching the connectors, by electrical conduction and field effects through the surrounding conductive sea water.

It will be appreciated that electrical connectors are commonly used in dry air environments where, within energy limits, it is possible to effect direct simultaneous physical and electrical disconnection of electrical contacts without the consequent arc or sparking causing significant damage or injury. Such direct disconnection is highly inadvisable in the above described hazardous environments.

DESCRIPTION OF THE PRIOR ART

The prior art includes commercially available electrical power supply systems wherein cables, connectors and equipment are located in a hazardous area and power control switches for the system are located in a safe area separated by a physical barrier from the hazardous area. A disadvantage is that a person working within the hazardous area cannot be certain that the power is switched off, and such systems do not meet the group I IEC standard 79-0 referred to above.

The prior art also includes commercially available electrical power supply systems including inductive connectors, i.e. connectors through which power is conveyed by transformer action. Inductive connectors can be mechanically separated to terminate power flow without breaking an electrical circuit and consequently no arc or sparking arises. Disadvantages are that inductive connectors are limited in operation by their power transfer capabilities in relation to their physical size, by their precise alignment tolerances, and by their inability to operate under DC power conditions.

GB-A-2152302 describes an electrical connector system wherein a pair of relay wires extend along a cable together with the power conductors, and a set of relay contacts, e.g. pins and sockets, electrically connect the relay wires through the connector. Mechanical separation of the connector withdraws the relay pins from their sockets which trips a relay to operate the main circuit breaker located in a safe area at the end of the cable remote from the connector. The power contacts, e.g. pins and sockets, for the power conductors are longer than the relay pins so that power in the main conductors is shut off by the main circuit breaker before arcing can occur.

A disadvantage of the above system is that the relay pins and sockets themselves conduct electrical power and therefore their physical separation can still generate sparking. The electrical power in such sparking will be lower than power circuit sparking would be, but energy as low as 125 microwatts can cause explosion in certain highly hazardous gases. Another disadvantage of the above system in certain circumstances is that the circuit breaker is remote from the connector and the person working in the hazardous area may thus be uncertain whether or not the power has in fact been switched off.

SUMMARY OF THE INVENTION

An object of the present invention is to provide an electrical connector with automatic power control and capable of use in a hazardous environment such as under water or in a potentially explosive atmosphere.

A further object is to make it possible to provide an electrical connector with enhanced power transfer capability.

According to the present invention there is provided an electrical connector comprising a pair of connector bodies each having an electrical power contact and a control signal transmission means, the electrical power contacts engaging one another to permit power transmission when the bodies are connected and separating from engagement with one another when the bodies are moved apart by a first predetermined distance, the control signal transmission means cooperating with one another to permit passage of an optical, magnetic or electromagnetic field signal therebetween when the bodies are connected and not to permit passage of said signal therebetween when the bodies are moved apart by a second predetermined distance less than said first distance, said control signal being adapted to control operation of a power switch connected in use in the power circuit including said contacts, whereby movement of said bodies apart by said second distance causes opening of said power switch to break the power circuit before the contacts separate from engagement with one another.

The control signal transmission means preferably each include light transmission paths which are disposed in registration with one another to transmit a light signal therebetween when the bodies are connected and which move out of registration so as not to pass said light signal therebetween when the bodies are moved apart by said second distance. The light transmission paths may each include an optical fibre.

The invention also provides an electrical power distribution system comprising first and second connectors each as set forth above, the contacts of one connector body of the first connector being adapted for connection to an electrical power supply and the contacts of the other connector body of the first connector being connected to the conductors of a distribution cable, the contacts of one connector body of the second connector being connected to the conductors at the remote end of said distribution cable and the contacts of the other connector body of the second connector being adapted for connection to a power utilization device.

Embodiments of the invention will now be described, by way of example, with reference to the accompanying drawings, in which:

DESCRIPTION OF THE DRAWINGS

Referring to FIG. 1 there is shown an electrical connector comprising male and female connector bodies 10,11 in the mated condition. The male body has electrical power contact pins 12 and control signal transmission means in the form of a substantially U-shaped optical fibre light transmission path 13 terminating in protruding fibre optic pins 14. The female body has electrical power contact sockets 15 and control signal transmission means in the form of fibre optic receiving sockets 16,17. In the fully mated condition the connector bodies are locked together by a locking collar 18 which is captive on the female body 11 and screwed onto a threaded portion 19 of the male body 10.

Figure 1:
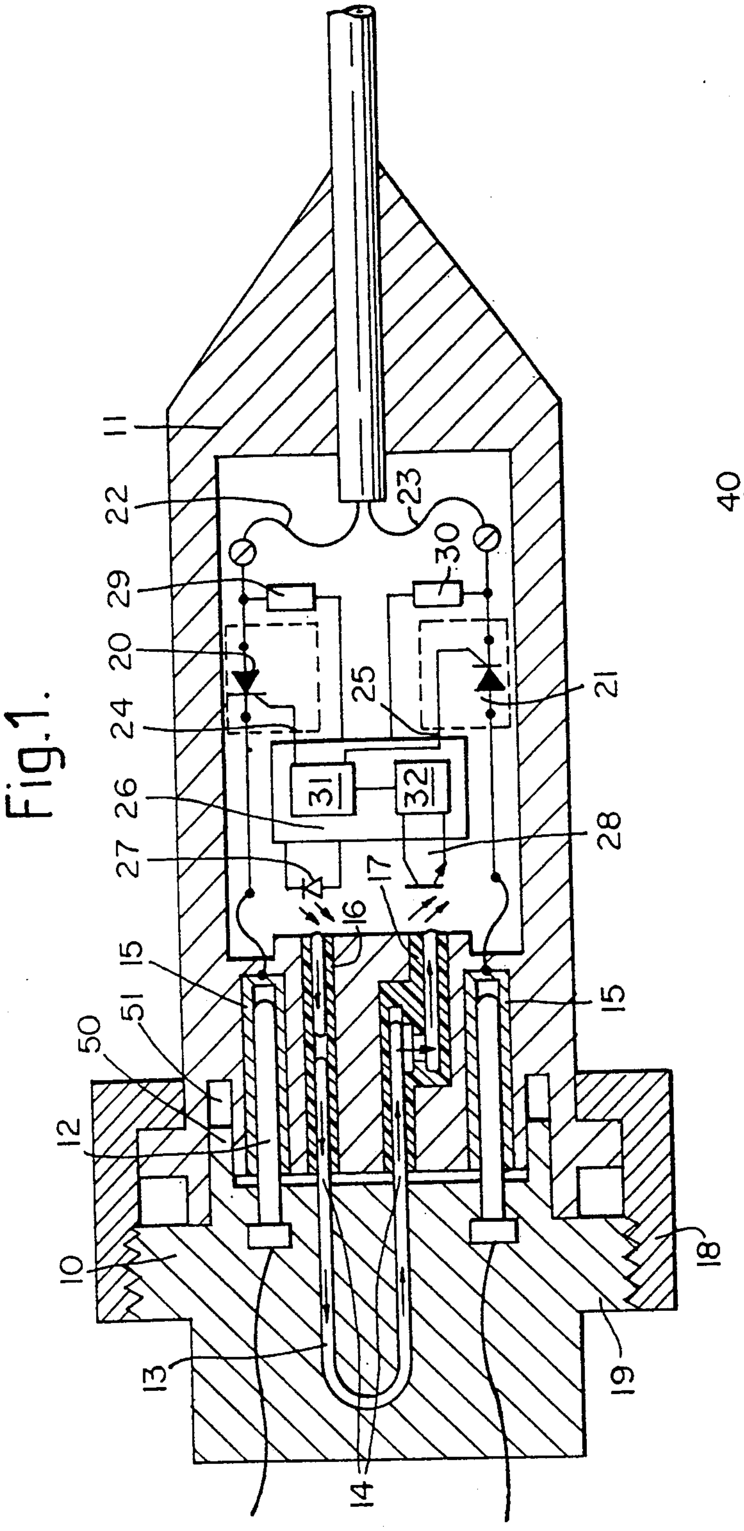
FIG. 1 is a longitudinal section of an electrical connector according to the invention and shown in the mated condition.

The female connector body 11 houses a power switch in the form of a power thyristor 20,21 connected in line with each of the main power conductors 22,23. The gates of the thyristors are connected by lines 24,25 to a thyristor control means 26. The thyristor control means 26 may comprise any ordinary power thyristor firing control circuit known to those skilled in the art and illustrated for example in the General Electric SCR (silicon controlled rectifier) manuals.

The control means 26 is also provided with a light source in the form of a light emitting diode 27 and a light receptor in the form of a phototransistor 28. The light emitting diode 27 is disposed to transmit a light signal, in the optical, infra-red or ultra-violet portions of the electromagnetic spectrum, into the internal end of the fibre optic socket 16. The phototransistor 28 is disposed to receive the light signal from the internal end of the fibre optic socket 17. The control means 26 is energized through resistors, 29,30 from the power conductors 22,23 upstream of the thyristors 20,21. When the control means 26 is energized and the connector is fully mated as shown in FIG. 1, a light signal emitted by the diode 27 is transmitted through the fibre optic socket 16, into the upper fibre optic pin 14, along the U-shaped fibre optic path 13 within the male connector body 10, back along the lower fibre optic pin 14, through the fibre optic socket 17 and on to the phototransistor 28.

The control means 26 includes a gate signal generator 31 for generating the firing signals to fire the thyristors 20,21, and an inhibit circuit 32 connected to the generator 31 to inhibit generation of the firing signals unless the inhibit circuit is disabled. The phototransistor 28 is connected to the inhibit circuit 32 to disable the inhibit circuit when the phototransistor 28 is rendered conductive by reception by a light signal from the fibre optic socket 17. Accordingly, the power thyristors can only be fired when a light signal from the diode 27 successfully negotiates the above described light transmission path through to the phototransistor 28.

Figure 2:
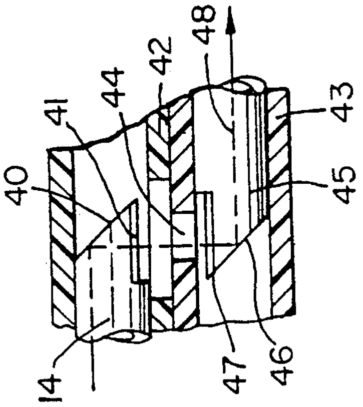
FIG. 2 is a partial view on an enlarged scale of a portion of FIG. 1.

FIG. 2 shows a portion of the fibre optic circuit 17 on an enlarged scale. The tip of the lower male fibre optic pin 14 is formed with a 45° internal reflector 40 and a light exit window 41. The socket 17 includes an upper portion 42 which is blind at the inner end and which actually receives the pin 14, and a lower portion 43 which is blind at the outer end and which opens on to the light receiving face of the phototransistor 28. The upper and lower portions communicate through a port 44 of restricted diameter. The lower portion houses a fibre optic member 45 having a tip formed with a 45° internal reflector 46 and a light entry window 47 disposed to receive light emitted by the exit window 41 at the tip of the male pin 14, and following a ray path exemplified by the dashed line 48.

The restricted diameter of the port 44 is small compared with a first predetermined distance, i.e. the length of the power contact pins 12. In consequence of this feature, when the bodies 10,11 are moved apart by a second predetermined distance, comparable to the diameter of the port 44, the pin 14 withdraws and the reflector 40 is no longer opposite port 44 so that the light signal cannot pass through to the phototransistor 28. The inhibit circuit 32 consequently inhibits the gate signal generator 31 and the power thyristors promptly turn off to break the power circuit in both lines. The power circuit is broken while the power contact pins 12 are still substantially wholly received within the sockets 15 and therefore the risk of an arc or sparking is obviated. The pins 12 and the sockets 15 are de-energized before the connector is physically separated and are thus not exposed to the surrounding sea water or other hazardous environment in an energized condition.

As shown in FIG. 1 the connector bodies 10, 11 are provided with an inter-engaging cylindrical sealing flange and socket 50,51 to obviate ingress of sea water or hazardous gas until the locking collar 18 is substantially unscrewed.

The described and illustrated arrangement of the windows and the port 44 in FIG. 2 has the additional advantage of being a safety feature protecting against unintended firing of the thyristors by a diver's torch or other light source shone directly into the socket 17 when the connector bodies 10,11 are un-mated. The Z-bend in the light path 48 provided by the two 45° reflectors minimizes this possibility.

In an alternative embodiment the diode 27 and the phototransistor 28 may be adapted to transmit and receive a coded light signal, for example an oscillatory signal of a predetermined frequency. The inhibit circuit 32 would then include circuitry obvious to those skilled in the art to detect and respond only to the predetermined frequency or other coded signal.

It will be appreciated that the power thyristors may be replaced by other controllable switches, for example TRIAC's or MOSFET's.

In another embodiment the control signal transmission means may comprise a capacitive proximity switch in the female body 11 and a capacitive proximity switch operating member in the male body 10. In yet another embodiment the control signal transmission means may comprise a permanent magnet in the male body 10 and a magnetically operable reed switch in the female body 11.

Figure 3:
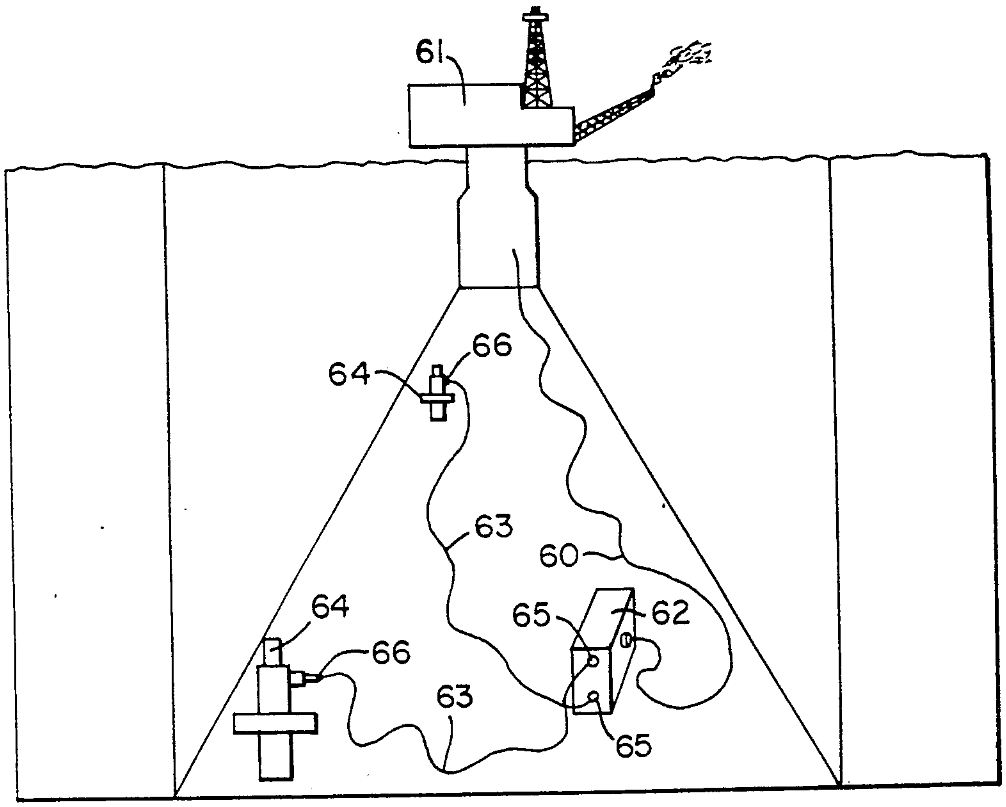
FIG. 3 is a schematic view of a subsea electrical power distribution system.

Referring now to FIG. 3, there is shown a schematic view of a subsea electrical power distribution system. An umbilical cable 60 supplies electrical power from a platform 61 to a distribution box 62. A plurality of power supply cables 63 conduct power from the distribution box 62 to power utilization devices such as installation or maintenance tools or well head pumping equipment in the vicinity of well heads shown schematically at 64.

Each cable 63 has a connector at each end thereof in accordance with the invention. In FIG. 3 these connectors are shown generally by numerals 65 at the ends of cables 63 adjacent the distribution box 62 and by reference numerals 66 at the ends of the cables 63 adjacent the power utilization devices 64.

Figure 4:
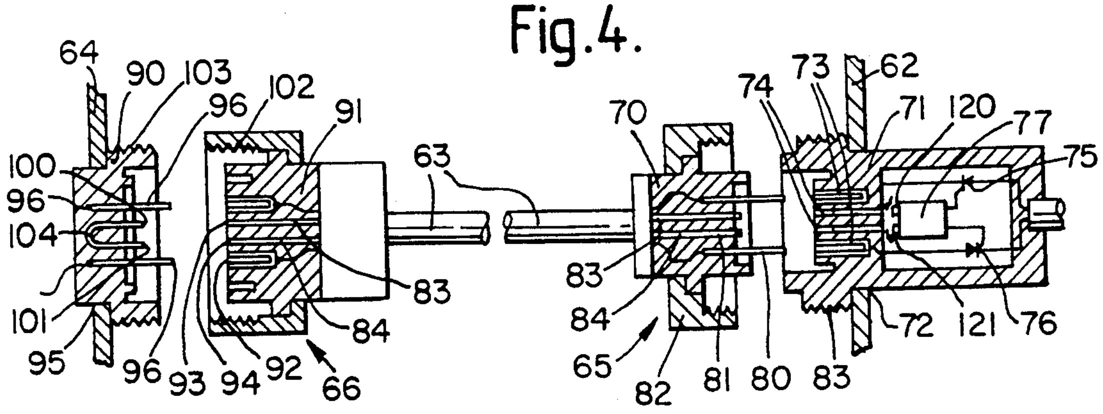
FIG. 4 is a longitudinal section of two connectors and a cable in the system of FIG. 3.

Referring now to FIG. 4 there is shown the cable 63 extending between connectors 65 and 66, each shown in the un-mated condition.

The connector 65 has a male portion 70 and a female portion 71. The female portion 71 is substantially identical in its internal optical, electrical and electronic construction to the female connector body 11 shown in FIG. 1. The female body 71 is secured in an opening 72 in an external wall of the distribution box 62, and is sealed in a water-tight manner in the opening in a manner known to those skilled in the underwater electrical art. The female body has electrical power contact sockets 73 and fibre optic receiving sockets 74 exposed externally of the box 62, and the body 71 houses power thyristors 75,76 and thyristor control means 77 in the portion of the female body located in the interior of the box 62.

The male connector body 70 has electrical power contact pins 80 and fibre optic protruding pins 81 disposed in a similar manner to the pins 12 and 14 in FIG. 1 and adapted for reception in the respective sockets 73 and 74 of the female body 71. In the fully mated condition the connector bodies 70 and 71 are locked together by a locking collar 82 which is captive on the male body 70 and screwed onto a threaded portion 83 of the female body.

In this embodiment of the male connector body the fibre optic pins 81 are not optically coupled to one another by a U-shaped fibre optic path 13 as shown in the FIG. 1 embodiment. Instead, independent optical fibre lines 83,84 extend from the separate pins 81 along the full length of cable 63 to the remote connector 66.

The cable 63 thus includes first and second power conductors electrically connected to the respective male pins 80 and first and second fibre optic lines 83 and 84 serving as pilot lines.

The remote connector 66 comprises a male connector body 90 and a female connector body 91. The female body 91 has electrical power contact sockets 92 electrically connected to the respective power conductors in the cable 63, and fibre optic receiving sockets 93,94 in respective optical communication with the pilot fibre optic lines 83,84 from the cable 63. The female body 91 does not house any optical, electrical or electronic active components unlike the female connector body 11 of FIG. 1 and the body 71 of FIG. 4.

The male connector body 90 is sealingly secured in an opening 95 in the wall of the power utilization equipment at the well head 64. The male body has electrical power contact pins 96 for reception in the sockets 92 to receive electrical power from the cable and to supply the power to the utilization device along leads 99. The male body also has protruding fibre optic pins 100,101 for reception in the fibre optic sockets 93,94. In the fully mated condition the connector bodies 90,91 are locked together by a locking collar 102 which is captive on the female body 91 and screwed onto a threaded portion 103 of the male body 90. The fibre optic pins 100,101 communicate optically with one another along a substantially U-shaped optical fibre light transmission path 104 within the male body 90. This path 104 is similar to the U-shaped optical fibre light transmission path 13 in the embodiment of FIG. 1.

In operation of the supply system shown in FIG. 4, a light signal generated by phototransistor 120 within female body 71 is transmitted through the upper mated socket 74 and pin 81 along the fibre optic pilot line 83, through the mated fibre optic socket 93 and pin 100, around the U-shaped path 104 in the connector body 90 most remote from the distribution box 62, and back through mated pin 101 and socket 94, along the pilot fibre optic line 84, through the mated lower pin 81 and socket 74 and finally on to the phototransistor 121. It will therefore be appreciated that physical separation of either of the two connectors 65 and 66 by the second predetermined distance or damage to either of said pilot lines 83,84 at any point along the cable 63 causes interruption of transmission of the optical control signal in its extended path between the diode 120 and the phototransistor 121, thereby causing opening of said thyristors 75 and 76 in the same manner as has been described in detail in connection with FIGS. 1 and 2.

In an alternative embodiment each of the connectors 65 and 66 can be substantially identical to the FIG. 1 embodiment, and the cable can include a pilot line extending between the first and second connectors, separate means being provided for transmitting a pilot signal along the pilot line, and means responsive to interruption of the pilot signal to cause opening of the thyristors in either or both of the connectors at opposite ends of the cable 63.

It is possible for a situation to arise wherein the power conductors in the cable 63 are seriously damaged and severed, but the fibre optic pilot lines 83 and 84 remain intact. To cover this eventuality the distribution system can include a current interrupter, preferably located within the distribution box 62. In the case where a power conductor is only partially severed or exposed to sea water, the system may include a detection circuit such as an earth leakage detection circuit operable upon detection of earth leakage to switch off the main power, for example by turning off thyristors 75 and 76 within the distribution box 62.

In any described embodiment, the female connector body, or the male connector body may include a residual power dissipation arrangement such as a Zener barrier known in the art. The Zener barrier is preferably included within box 26 as shown in FIG. 1 or box 77 as shown in FIG. 4.

In each embodiment it will be appreciated that recognized techniques known in the art may be employed. For example, cable 63 should be an armoured cable and the pilot lines 83,84 should be disposed towards the exterior surface of the cable so as to be more likely to be damaged than the main conductors. The optical, electronic and electrical components housed within the connector bodies should be designed to accepted intrinsically safe standards and encapsulated according to their expected duty. Hazardous environments within which the connectors may be required to function include under water, potentially explosive gaseous atmospheres, humid and polluted conditions and in specialized circumstances such as abattoirs, dusty atmospheres and in car washes.

Figure 5:
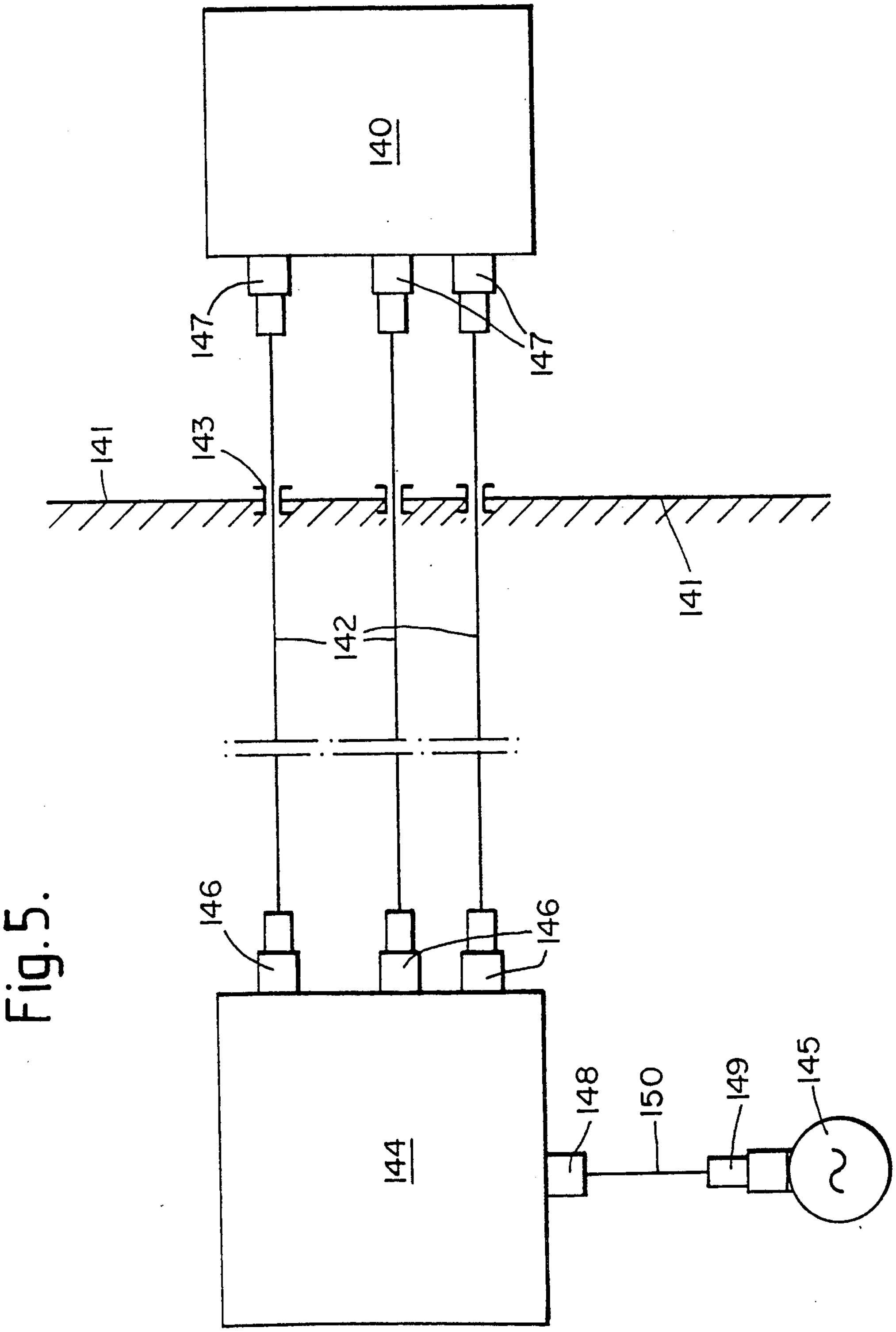
FIG. 5 is a schematic view of a power distribution system for supplying equipment in a hazardous area.

Referring now to FIG. 5, there is shown a schematic electrical circuit diagram of a power distribution arrangement in a hazardous area such as a potentially explosive atmosphere. A power distribution box 140 is located in the safe area to the right hand side of the physical barrier 141. Power is supplied by lines 142 extending sealingly through openings 143 in the barrier 141. The supply lines extend into the hazardous area to the left hand side of barrier 141. The supply cables 142 are connected into a junction box 144 provided with a number of outlets such as supply cable 150 for supplying power to an electric motor 145.

The connectors 146,147 at the opposite ends of cable 142 are constructed in a similar manner to the connectors 66 and 65 shown in FIG. 4 and cable 142 is similar to cable 63. The connectors 148 and 149 together with cable 150 may again be constructed in a similar manner to cable 63 and its end connectors 65 and 66.

The invention as described is thereby capable of providing a power connector for use in a hazardous environment, such as in a sub-sea electrical power distribution system for distributing power to remote oil well heads from a marine platform. The described system provides positive disconnection at the sub-sea connector, even if the primary power source at the marine platform has been accidentally left live, therefore ensuring diver safety. The provision of a solid state thyristor housed within the connector body itself thus provides electrical power handling capability, e.g. to several kilowatts, and also obviates the need to run electrical control signal lines back along the distribution cables right up to the surface at the marine platform itself.

I claim:

1. An electrical power connector for use in a hazardous environment, said connector comprising:

first and second connector bodies;

a first electrical power contact and a first control signal transmission means associated with said first connector body;

a second electrical power contact and a second control signal transmission means associated with said second connector body;

said first and second electrical power contacts positioned to engage one another to permit power transmission when said connector bodies are mutually connected and separating from physical engagement with one another when said connector bodies are moved apart by a first predetermined distance;

said first and second control signal transmission means positioned to cooperate with one another to permit passage of an optical, magnetic or electromagnetic field control signal therebetween when said connector bodies are mutually connected and not to permit passage of said control signal therebetween when said connector bodies are moved apart by a second predetermined distance less than said first predetermined distance;

an electrical power switch associated with at least one of said first and second connector bodies and connected in use in an electrical power circuit including said first and second electrical power contacts;

said electrical power switch being responsive to said control signal so that movement of said first and second connector bodies apart by said second distance causes opening of said electrical power switch to break said electrical power circuit before said first and second electrical power contacts separate from physical engagement with one another.

2. An electrical power connector according to claim 1 wherein one of said first and second connector bodies includes an integral housing, and said electrical power switch comprises a solid state electrical power switch located within said housing.

3. An electrical power connector according to claim 2 including a power switch control means also located within said housing, said power switch control means being responsive to the presence of said control signal to allow closure of said electrical power switch and responsive to the absence of said control signal to cause opening of said electrical power switch.

4. An electrical power connector according to claim 3 including an intrinsically safe electrical energy dissipative device also located within said housing, said dissipative device being electrically connected to said power circuit so as to dissipate electrical energy following opening of said electrical power switch.

5. An electrical power connector according to claim 1 wherein said first and second control signal transmission means include respective first and second light transmission paths, said first and second light transmission paths being disposed in registration with one another to transmit a light signal therebetween when said connector bodies are connected and which move out of registration so as not to pass said light signal therebetween when said connector bodies are moved apart by said second distance.

6. An electrical power connector according to claim 5 wherein said first and second light transmission paths each include an optical fibre.

7. An electrical power connector according to claim 5 wherein said control signal transmission means in said first connector body comprises first and third light transmission paths and wherein said control signal transmission means in said second connector body comprises a second light transmission path adapted for registration at one end with said first path and at its other end with said third path, whereby when said first and second connector bodies are connected a light signal can propagate sequentially along said first, second and third paths.

8. An electrical power connector according to claim 7 wherein said first and third paths each include an optical fibre and wherein said second path includes a substantially U-shaped optical fibre.

9. An electrical power connector according to claim 7 wherein one of said first and second connector bodies includes an integral housing, said electrical power switch comprises a solid state electrical power switch located within said housing, a power switch control means is also located within said housing, said power switch control means including a light source and a light receptor, said light source being adapted to transmit a light signal into said first light transmission path and said light receptor being adapted to receive said light signal from said third transmission path, said power switch control means being responsive to reception of said light signal by said light receptor to allow said closure of said electrical power switch and responsive to the absence of said light signal at said light receptor to cause opening of said electrical power switch.

10. An electrical power connector according to claim 9 wherein said third transmission path includes a portion adapted to cooperate optically with a portion of said second transmission path to allow transmission of said light signal when said first and second connector bodies are mutually connected and are within said second distance, said portion of said third transmission path substantially preventing transmission therethrough of any other light entering the third transmission path in the absence of said second connector body within said second distance of said first connector body.

11. An electrical power connector according to claim 9 wherein said light source is adapted to emit a coded light signal and said light receptor is adapted to respond to said coded light signal.

12. An electrical power distribution system comprising first and second electrical power connectors each as claimed in claim 1, said electrical power contacts of said first connector body of said first connector being adapted for connection to an electrical power supply, and said electrical power contacts of said second connector body of said first connector being connected to the conductors of a power distribution cable, said electrical power contacts of said first connector body of said second connector being connected to the conductors at the remote end of said distribution cable, and said electrical power contacts of said second connector body of said second connector being adapted for connection to a power utilization device.

13. An electrical power distribution system according to claim 12 including a pilot line extending along said power distribution cable between said first and second electrical power connectors, said power distribution cable and said first and second electrical power connectors being adapted for use wholly in a said hazardous environment, means for transmitting a pilot signal along said pilot line, and means responsive to interruption of said pilot signal to cause opening of said electrical power switch.

14. An electrical power distribution system according to claim 12 including a pilot line extending along said power distribution cable between said first and second electrical power connectors, said control signal transmission means in each of said first and second electrical power connectors being adapted to cooperate with one another and with said pilot line to permit passage of said optical, magnetic or electromagnetic field signal along said pilot line, whereby damage to said cable sufficient to interrupt said pilot line interrupts transmission of said control signal thereby causing opening of said electrical power switch.

15. An electrical power distribution system according to claim 14 wherein said control signal transmission means in each of said first and second electrical power connectors cooperate with one another and with said pilot line to permit passage of said optical, magnetic or electromagnetic field signal in sequence from said first to said second connector body of said first electrical power connector, along said cable in a first said pilot line, from said second to said first and back to said second connector body of said second electrical power connector, back along said cable in a second said pilot line, and from said second to said first connector body of said first electrical power connector, whereby separation of said connector bodies of either of said first and second connectors by said second distance or damage to either of said first and second pilot lines interrupts transmission of said control signal thereby causing opening of said electrical power switch.

16. A system according to claim 13 wherein said pilot line includes an optical fibre and said control signal transmission means are adapted to transmit light signals.

* * * * *